United States Patent
Kumar et al.

(10) Patent No.: US 10,762,664 B2
(45) Date of Patent: Sep. 1, 2020

(54) MULTI-CAMERA PROCESSOR WITH FEATURE MATCHING

(71) Applicant: Intel Corporation, Santa Clara, CA (US)

(72) Inventors: Avinash Kumar, Santa Clara, CA (US); Manjula Gururaj, Fremon, CA (US); Ramkumar Narayanswamy, Boulder, CO (US)

(73) Assignee: Intel Corporation, Santa Clara, CA (US)

( * ) Notice: Subject to any disclaimer, the term of this patent is extended or adjusted under 35 U.S.C. 154(b) by 173 days.

(21) Appl. No.: 15/858,063

(22) Filed: Dec. 29, 2017

(65) Prior Publication Data

US 2019/0043220 A1   Feb. 7, 2019

(51) Int. Cl.
| | |
|---|---|
| G06T 7/80 | (2017.01) |
| G06T 7/11 | (2017.01) |
| G06T 7/174 | (2017.01) |
| G06T 7/73 | (2017.01) |
| H04N 5/247 | (2006.01) |
| G06T 7/38 | (2017.01) |
| G06T 7/60 | (2017.01) |
| H04N 5/232 | (2006.01) |
| H04N 17/00 | (2006.01) |
| H04N 5/225 | (2006.01) |

(52) U.S. Cl.
CPC ............ *G06T 7/85* (2017.01); *G06T 7/11* (2017.01); *G06T 7/174* (2017.01); *G06T 7/38* (2017.01); *G06T 7/60* (2013.01); *G06T 7/73* (2017.01); *H04N 5/2258* (2013.01); *H04N 5/232127* (2018.08); *H04N 5/232945* (2018.08); *H04N 5/247* (2013.01); *H04N 17/002* (2013.01); *G06T 2207/10024* (2013.01); *G06T 2207/30244* (2013.01)

(58) Field of Classification Search
None
See application file for complete search history.

(56) References Cited

U.S. PATENT DOCUMENTS 9,303,525 B2 * 4/2016 Aerts ................. F01D 21/003
10,122,993 B2 * 11/2018 Venkataraman .......... G01P 3/38
(Continued)

OTHER PUBLICATIONS

Gurbuz, S. , et al., "Color Calibration for Multi-Camera Imaging Systems", 2010 4th International Universal Communication Symposium (2010) (Year: 2010).*

(Continued)

*Primary Examiner* — Lindsay J Uhl
(74) *Attorney, Agent, or Firm* — Green, Howard & Mughal LLP.

(57) ABSTRACT

An embodiment of a semiconductor package apparatus may include technology to capture two or more concurrent images of a scene with two or more cameras, detect a feature in a first image from a first camera of the two or more cameras, match the feature in a second image from a second camera of the two or more cameras, and perform a photometric calibration between the first camera and the second camera based on a portion of the first image corresponding to the detected feature and a portion of the second image corresponding to the matched feature. Other embodiments are disclosed and claimed.

20 Claims, 10 Drawing Sheets

(56) References Cited

U.S. PATENT DOCUMENTS

2003/0214323 A1* 11/2003 Mizuno .............. H03K 19/1735
326/40
2003/0234866 A1* 12/2003 Cutler .................... G06T 5/008
348/207.1

OTHER PUBLICATIONS

Gurbuz, S., et al., "Color Calibration for Multi-Camera Imaging Systems", 2010 4th International Universal Communication Symposium (Year: 2010).*

Gurbuz et al., "Color calibration for multi-camera imaging systems", Universal Communication Symposium (IUCS), IEEE, 2010, 6 pages.

Welch et al., "Ensuring color consistency across multiple cameras", The 10th IEEE Conference on Computer Vision (ICCV), Beijing, China, Oct. 17-20, 2005, 8 pages.

Joshi, Neel S., "Color calibration for arrays of inexpensive image sensors", retrieved from vlsiweb.stanford.edu/people/alum/pdf/0404_Neel_Joshi_Color_Calibration_MS.pdf, Mar. 2004, 30 pages.

Li et al., "Collaborative color calibration for multi-camera systems", Tsinghua National Laboratory of Information Science and Technology, Nov. 18, 2010, 11 pages.

Yamamoto et al., "Color correction for multi-view video using energy minimization of view networks", International Journal of Automation and Computing, Jul. 2008, pp. 234-245.

* cited by examiner

MULTI-CAMERA PROCESSOR WITH FEATURE MATCHING

TECHNICAL FIELD

Embodiments generally relate to multi-camera systems. More particularly, embodiments relate to a multi-camera processor with feature matching.

BACKGROUND

A multi-camera system may enable functionality such as depth extraction, three-dimensional (3D) reconstruction, panoramic imaging, etc. Images concurrently produced by multiple cameras may be processed to provide such functionality.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
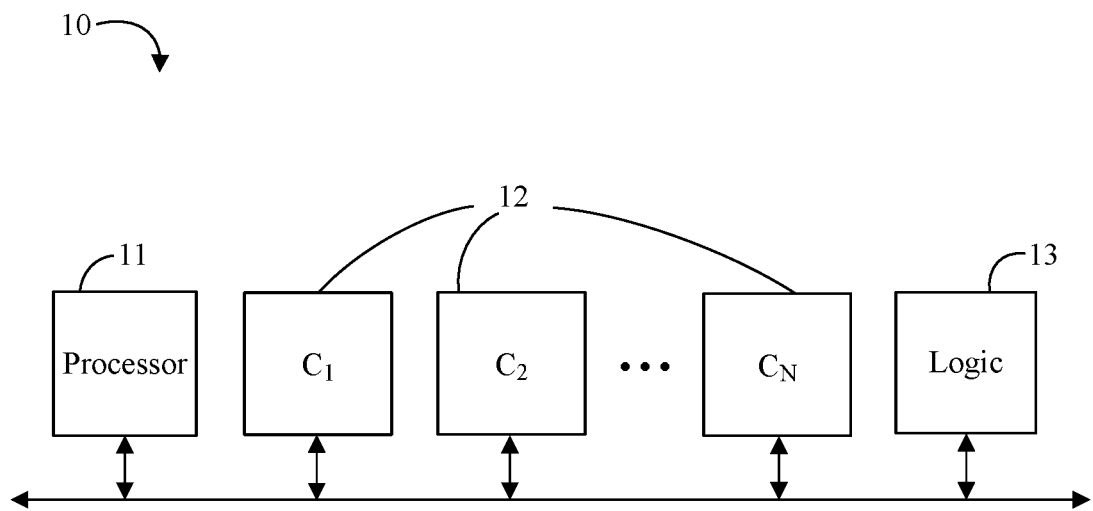
FIG. 1 is a block diagram of an example of an electronic processing system according to an embodiment.

Turning now to FIG. 1, an embodiment of an electronic processing system 10 may include a processor 11, two or more cameras 12 (e.g., camera $C_1$ through $C_N$, where N>1) communicatively coupled to the processor 11 to capture two or more concurrent images of a scene, and logic 13 communicatively coupled to the processor 11 to detect a feature in a first image from a first camera $C_1$ of the two or more cameras 12, match the feature in a second image from a second camera $C_2$ of the two or more cameras 12, and perform a photometric calibration between the first camera $C_1$ and the second camera $C_2$ based on a portion of the first image corresponding to the detected feature and a portion of the second image corresponding to the matched feature. In some embodiments, the logic 13 may be configured to define a first region of interest (ROI) for the first camera $C_1$ based on the detected feature in the first image, define a second ROI for the second camera $C_2$ based on the matched feature in the second image, and perform the photometric calibration between the first camera $C_1$ and the second camera $C_2$ based on the first ROI and the second ROI. For example, the logic 13 may be configured to define the first and second regions of interest (ROIs) based on respective positions and sizes of the feature in the first and second images.

In some embodiments of the system 10, the logic 13 may be additionally or alternatively configured to define a first ROI for the first camera $C_1$, detect the feature in the first image based on the first ROI, define a second ROI for the second camera $C_2$ based on the matched feature in the second image, and perform the photometric calibration between the first camera $C_1$ and the second camera $C_2$ based on the first ROI and the second ROI. For example, the logic 13 may be configured to define the second ROI based on a position and size of the matched feature in the second image. In any of the embodiments herein, the logic 13 may also be configured to determine one or more parameter values for each of the two or more cameras based on the photometric calibration. For example, the photometric calibration may determine parameter values for one or more of focus, color correction, gamma correction, sharpness, exposure, black level, noise, white balance, and contrast.

Embodiments of each of the above processor 11, cameras 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, main memory, persistent storage media, or other system memory may store a set of instructions which when executed by the processor 11 cause the system 10 to implement one or more components, features, or aspects of the system 10 (e.g., the logic 13, detecting the feature in a first image, matching the feature in the second image, performing the photometric calibration, etc.).

Figure 2:
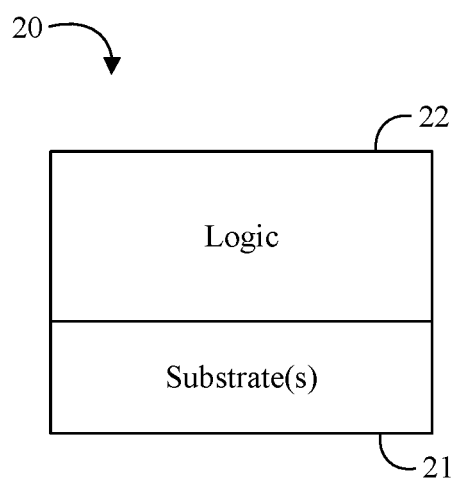
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates may be configured to capture two or more concurrent images of a scene with two or more cameras, detect a feature in a first image from a first camera of the two or more cameras, match the feature in a second image from a second camera of the two or more cameras, and perform a photometric calibration between the first camera and the second camera based on a portion of the first image corresponding to the detected feature and a portion of the second image corresponding to the matched feature. In some embodiments, the logic 22 may be configured to define a first ROI for the first camera based on the detected feature in the first image, define a second ROI for the second camera based on the matched feature in the second image, and perform the photometric calibration between the first camera and the second camera based on the first ROI and the second ROI. For example, the logic 22 may be configured to define the first and second ROIs based on respective positions and sizes of the feature in the first and second images.

In some embodiments, the logic 22 may be additionally or alternatively configured to define a first ROI for the first camera, detect the feature in the first image based on the first ROI, define a second ROI for the second camera based on the matched feature in the second image, and perform the photometric calibration between the first camera and the second camera based on the first ROI and the second ROI. For example, the logic 22 may be configured to define the second ROI based on a position and size of the matched feature in the second image. In any of the embodiments herein, the logic 22 may also be configured to determine one or more parameter values for each of the two or more cameras based on the photometric calibration. For example, the photometric calibration may determine parameter values for one or more of focus, color correction, gamma correction, sharpness, exposure, black level, noise, white balance, and contrast.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 3A:
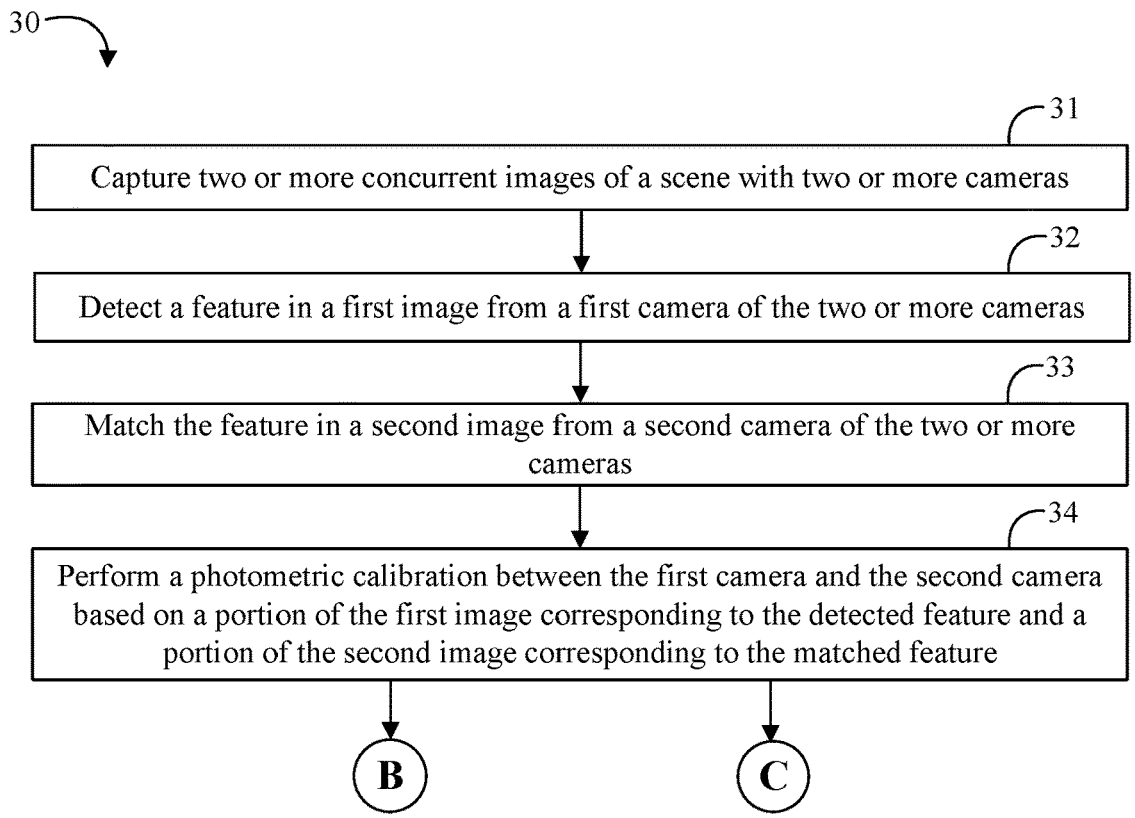
FIGS. 3A to 3C are flowcharts of an example of a method of calibrating multiple cameras according to an embodiment.
Figure 3B:
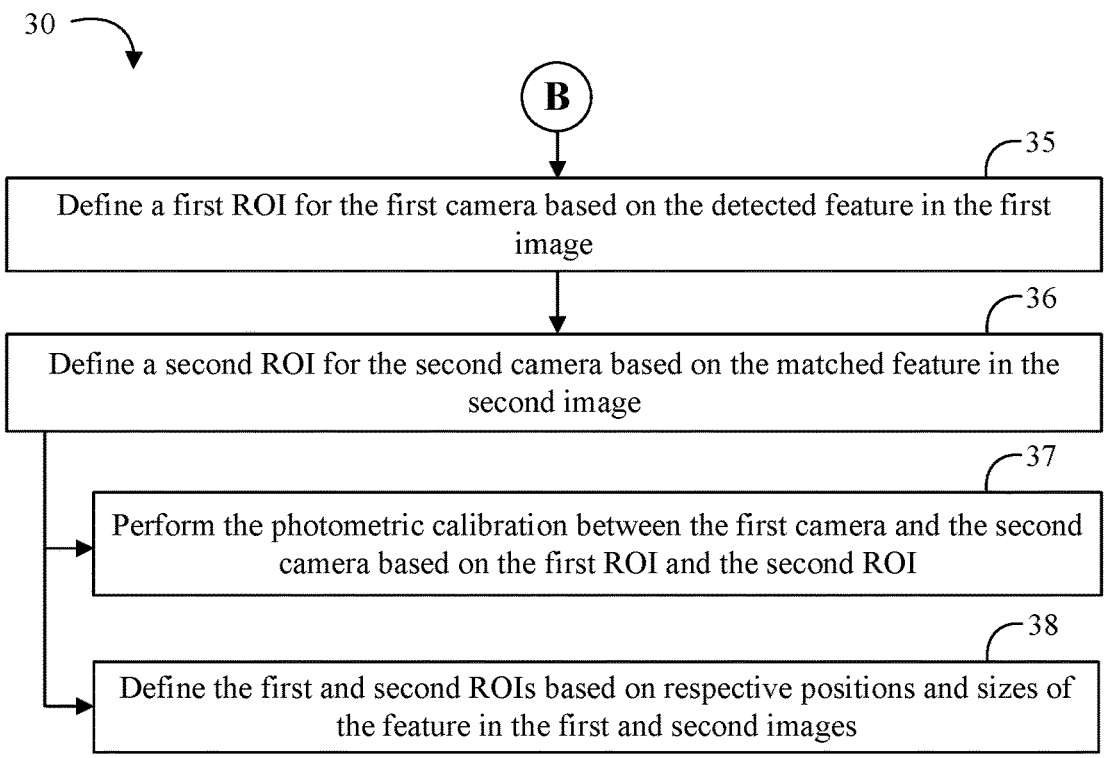
Figure 3C:
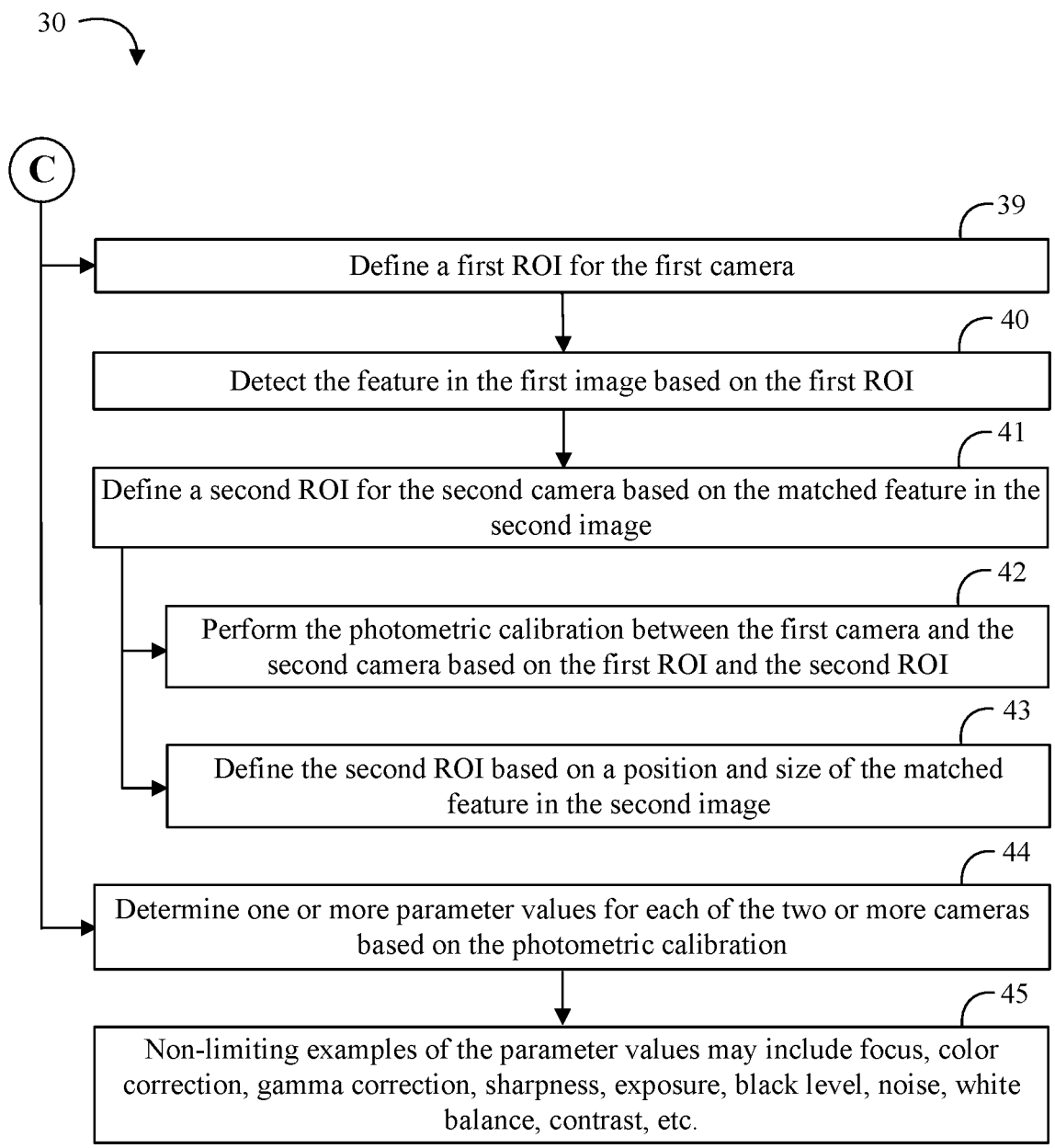

Turning now to FIGS. 3A to 3C, an embodiment of a method 30 of calibrating multiple cameras may include capturing two or more concurrent images of a scene with two or more cameras at block 31, detecting a feature in a first image from a first camera of the two or more cameras at block 32, matching the feature in a second image from a second camera of the two or more cameras at block 33, and performing a photometric calibration between the first camera and the second camera based on a portion of the first image corresponding to the detected feature and a portion of the second image corresponding to the matched feature at block 34. Some embodiments of the method 30 may further include defining a first ROI for the first camera based on the detected feature in the first image at block 35, defining a second ROI for the second camera based on the matched feature in the second image at block 36, and performing the photometric calibration between the first camera and the second camera based on the first ROI and the second ROI at block 37. For example, the method 30 may also include defining the first and second ROIs based on respective positions and sizes of the feature in the first and second images at block 38.

Some embodiments of the method 30 may additionally or alternatively include defining a first ROI for the first camera at block 39, detecting the feature in the first image based on the first ROI at block 40, defining a second ROI for the second camera based on the matched feature in the second image at block 41, and performing the photometric calibration between the first camera and the second camera based on the first ROI and the second ROI at block 42. For example, the method 30 may also include defining the second ROI based on a position and size of the matched feature in the second image at block 43. For any of the embodiments herein, the method 30 may also include determining one or more parameter values for each of the two or more cameras based on the photometric calibration at block 44. Non-limiting examples of the parameter values may include focus, color correction, gamma correction, sharpness, exposure, black level, noise, white balance, contrast, etc. at block 45.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 19 to 24 below. Embodiments or portions of the method 30 may be implemented in firmware, applications (e.g., through an application programming interface (API)), or driver software running on an operating system (OS).

Some embodiments may advantageously provide a multi-camera image signal processor (ISP) utilizing feature detection and matching. Multi-camera arrays may include various computational imaging capabilities such as depth-extraction (e.g., with a dual camera arrangement), 3D reconstruction, panoramic imaging, 360 video, etc. (e.g., more functionality than might be possible with a single camera). For an accurate functioning of a multi-camera array, it may be important to have calibrations at three levels including geometric (e.g., relative pose), photometric (e.g., similar image quality) and temporal (e.g., time synchronized capture). Some embodiments may improve photometric calibration by providing better photometric similarity across multi-camera images capturing the same scene.

Photometric properties of an image may include the exposure, focus, white-balance, gamma correction and sharpness settings with which the image was captured. These parameters may form different blocks of an ISP for a camera. Because each camera in the multi-camera array may have its own ISP, the cameras may generate images with photometric variation. For photometric calibration, all or most of these parameters may be adapted locally for each camera such that the output images after each component ISP block look similar. Successful calibration may result in a final set of color images from each camera that may appear more consistent with respect to all these parameters. Some other systems may utilize a master-slave technique where one camera is selected as the master camera and the other cameras of the multi-camera system are configured to have the same parameters as the master. Some parameters, however, are not amenable to the master-slave technique. For example, focusing may not work well with this technique because the ROI on which the master focuses may change as the camera viewpoint changes and using the same ROI for the slaves may result in focusing on a totally different object which may also be at a different distance. Some embodiments may provide a photometric calibration technique that advantageously allow for a dynamic ROI and may utilize optimization methods for parameter estimation.

Some embodiments may advantageously utilize feature detection and feature matching technology to dynamically define a ROI in an image for photometric calibration. Any suitable feature detection/matching technology may be used including scale-invariant feature transform (SIFT), Oriented FAST and rotated BRIEF (ORB), speeded up robust features (SURF), KAZE, AKAZE, etc. Some embodiments may utilize distinctive features and feature matching between multi-camera images obtained after each ISP block to define a dynamic ROI. For example, the ROI may correspond to a list of matching two-dimensional (2D) pixel locations and a descriptor of a region around the 2D pixel locations. For some ISP parameters (e.g., color correction), the defined ROI may be a function of the location of detected matching features. For other parameters (e.g., focus), a specific ROI may be defined in a master camera and then features inside that ROI may be tracked across images. In some embodiments, both scenarios may advantageously allow for a dynamic ROI.

In some embodiments, the properties of matching features (e.g., intensity, sharpness in a window, etc.) may be utilized as observations. For example, an error function parameterized by ISP parameters may be formulated based on the observations. The error function may then be solved as an optimization problem to arrive at improved or best multi-camera ISP parameters in an automated manner. Advantageously, some embodiments may provide technology to scale up the tuning and utilization of a multi-camera system. Some embodiments may determine improved or optimized parameter values for any block of a camera ISP, including but not limited to focus, color correction, gamma correction, sharpness, exposure, black level, noise, white balance, and contrast.

Some other multi-camera systems may require homogeneous cameras with very similar characteristics to maintain effective photometric calibration. Advantageously, some embodiments may utilize heterogeneous camera systems. In some embodiments, some photometric variations between heterogenous cameras may be effectively calibrated by determining appropriate ISP parameters to account for the variation. Due to the utilization of feature points by some embodiments, any heterogeneity across cameras which is not an ISP parameter may advantageously be encoded in the feature descriptor. Some embodiments may provide feature-based optimization techniques to determine multi-camera settings and/or operational-parameters. In some embodiments, single camera parameters may be systematically extended or optimized for a multi-camera system.

Figure 4A:
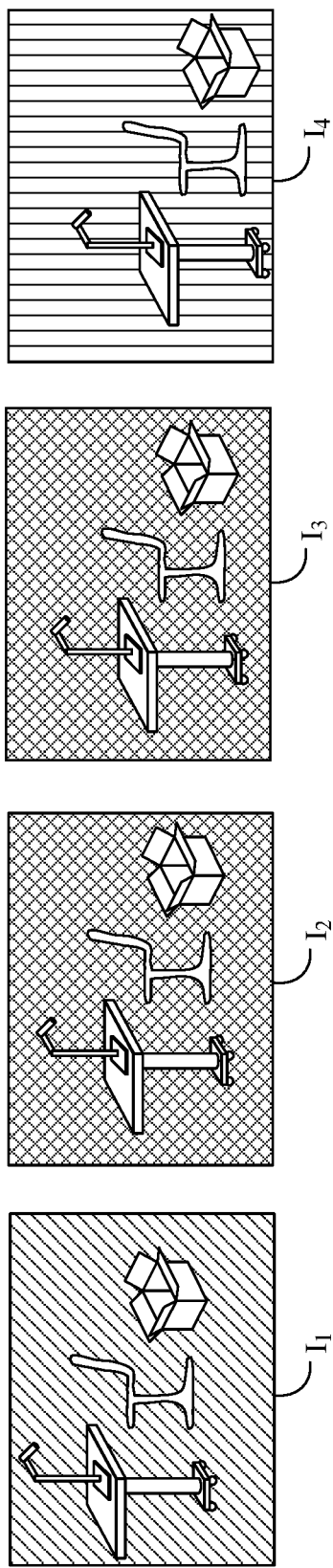
FIGS. 4A to 4B are illustrative diagrams of examples of images from multiple cameras according to an embodiment.
Figure 4B:
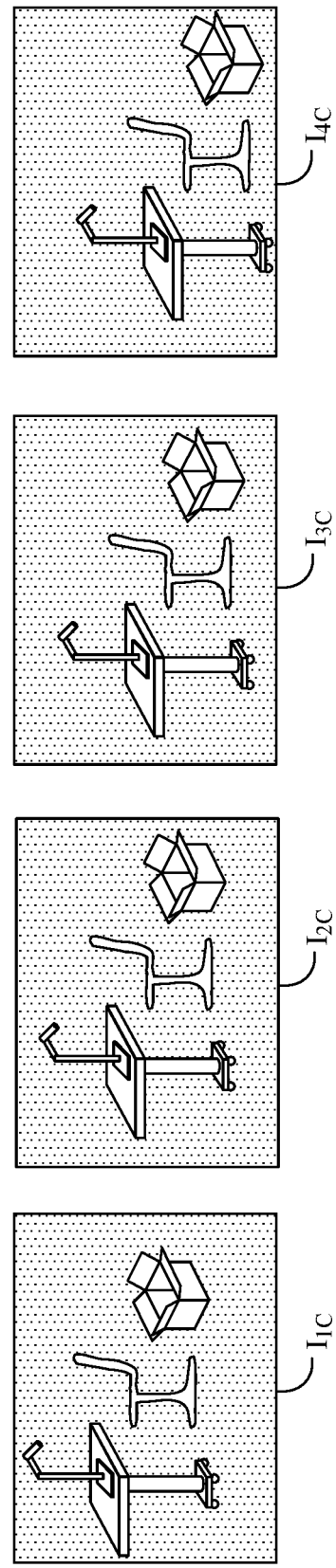

Turning now to FIGS. 4A to 4B, a set of four images $I_1$ through $I_4$ may have been concurrently captured by four corresponding cameras $C_1$ through $C_4$ (not shown). The captured images may have significant color temperature differences as represented by different hatch patterns (e.g., the image $I_1$ may be warmer while the image $I_2$ may have much colder hue). For example, even in a homogenous camera array there may be inconsistency between cameras with regards to various camera parameters (e.g., exposure, noise, color, sharpness, etc.). This inconsistency may lead to various issues in applications (e.g., such as computer vision) where the multiple images may be utilized. For example, the photometric variations may lead to visual artifacts in view interpolation and image stitching. Some embodiments may provide a global optimization of the color and gamma parameters of the individual cameras $C_1$ through $C_4$ to provide more photometrically similar final images. For example, feature based color and gamma correction may be applied to the captured images $I_1$ through $I_4$ to provide corrected images $I_{1C}$ through $I_{4C}$ (e.g., see FIG. 4B). The feature based color and gamma correction may lead to similar color temperatures such that the complete set of 4 corrected images $I_1$ through $I_4$ may achieve similarity in color temperatures as represented by the same hatch pattern in all four images. The corrected images $I_{1C}$ through $I_{4C}$ may help in mitigating some of these artifacts or otherwise improve the operation of downstream image processing applications.

Some embodiments may use feature detection and feature matching computed across multi-capture images to define dynamically changing ROI(s) depending on the camera viewpoint. Thereafter, an optimization function may be formulated which may be utilized to locally refine individual ISP parameter blocks to result in photometrically similar images (e.g., with respect to exposure, color, gamma, sharpness, etc.). The optimization function may be dependent on the ISP parameter block being optimized and some embodiments may achieve similarity in output images after each ISP block which is being parameterized. Some embodiments may apply such feature-based photometric calibration for multiple ISP parameter blocks such that the final obtained image from the ISP pipeline may be more similar in multiple respects.

Some other multi-camera systems may use a master-slave configuration where the master parameters may be computed an image region in the master image, and then the master parameters are broadcast to the slave cameras. Each slave either uses the master parameters directly (e.g., a focusing parameter) or adapts the master parameters independent of other slave cameras to optimize its own image criteria. Some other multi-camera systems may have feature based approaches which focus mainly on color correction, without applying any global optimization. Some embodiments may utilize feature detection and feature matching to sample data for ISP parameters and may also optimize the ISP parameters taking all of the cameras into account. For example, some embodiments may optimize over all the ISP parameters pertaining to each of the cameras in the multi-camera array simultaneously either globally or with respect to a specified master camera.

In some embodiments, feature matching may track similar features across images to define dynamically sized ROIs for the different camera images. The dynamically sized ROIs may be particularly advantageous for multi-camera arrays where each camera may have different viewpoints. Some embodiments may use feature matching for multi-camera ISP optimization.

Some embodiments may utilize a feature descriptor which is invariant to image properties not targeted by an ISP block. For example, an invariant feature descriptor which encodes the gradient information may be scaled around a feature point in two images of different resolution to determine sharpness. A scale around the feature point may not be affected by the resolution of the two images. Some other techniques may use a square window as the ROI around feature points and may have to first determine relative image scale to know the size of the windows to use for computing image gradient to determine focus.

Some other multi-camera systems may post-process the final image after ISP pipeline stage. Some embodiments may process intermediate ISP block images to achieve image similarity with respect to that particular ISP block. The intermediate processing may advantageously allow for greater flexibility in the ISP optimization pipeline as well as avoid information loss for techniques which work on the final ISP image.

Some embodiment may use feature detection and feature matching techniques to generate variable sized ROIs in each of the multi-camera images. The ROIs may correspond to the list of 2D pixel locations being tracked across the multi-camera images. Depending on the ISP parameter being optimized, the ROI may be the complete image (e.g., in case of color and gamma correction) or the ROI may be preselected in one of the images (e.g., all feature points inside a rectangular region in one of the images). These points may then be tracked in all the other images (e.g., in case of focus setting). Finally, an optimization error function dependent on the ISP parameter may be defined in the tracked ROI.

Figure 5:
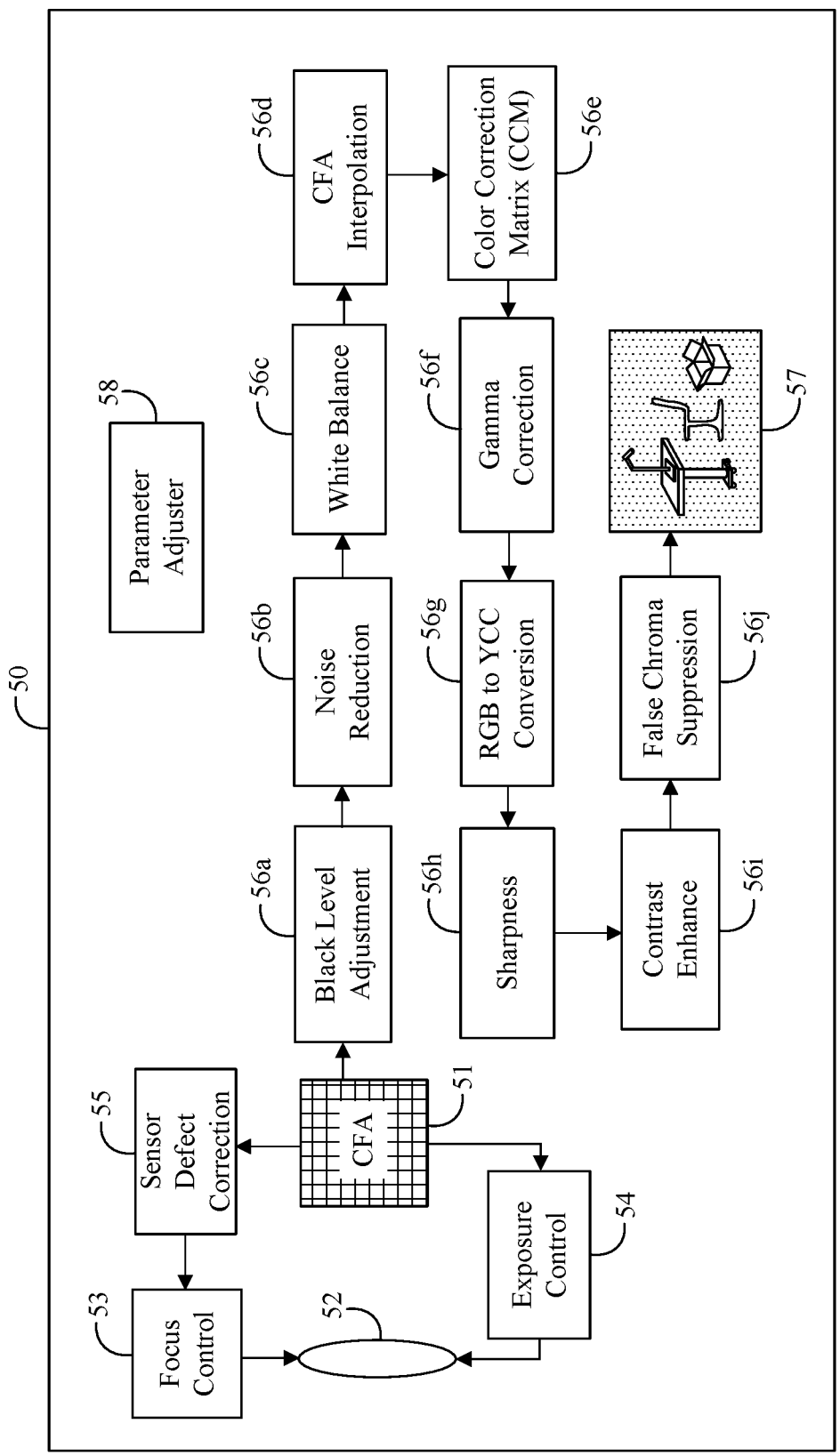
FIG. 5 is a block diagram of an example of a single camera according to an embodiment.

Turning now to FIG. 5, an embodiment of a single camera 50 may include an ISP pipeline having a variety of different ISP parameters/blocks. The camera 50 may include an image sensor 51 having pixel sensors with a color filter array (CFA) (e.g., or color filter mosaic (CFM), etc.) placed over the pixel sensors of the image sensor 51 to capture color information. A lens 52 may be appropriately positioned with respect to the image sensor 51. A focus control block 53 may control focus for the lens 52, and an exposure control block 54 may control exposure of images captured by the image sensor 51. A sensor defect correction block 55 may be coupled between the image sensor 51 and the focus control block 53. Image data from the image sensor 51 may be processed by the ISP pipeline which may include serially coupled ISP blocks including, for example, a black level adjustment block 56a, a noise reduction block 56b, a white balance block 56c, a CFA interpolation block 56d, a color correction matrix (CCM) block 56e, a gamma correction block 56f, a red-green-blue (RGB) to luminance-blue difference-red-difference (YCC) conversion block 56g, a sharpness block 56h, a contrast enhance block 56i, and a false chroma suppression block 56j. In some embodiments, the ISP pipeline may include more or fewer blocks and may include different ISP blocks and/or a different order of the blocks. The camera 50 may provide an output image 57 as a result of processing the image captured by the image sensor 51 through the ISP pipeline.

Numerous parameters may affect how the various control blocks and ISP blocks of the camera 50 operate. In accordance with some embodiments, the camera 50 may include a parameter adjuster 58 to adjust one or more parameters of the camera 50 based on feature detection, feature matching technology, and/or a dynamically defined ROI for photometric calibration with respect to one or more other cameras in a multi-camera system. For example, the camera 50 may be wired or wirelessly coupled to the other cameras, or to a centralized multi-camera processor, to utilize feature detection and feature matching technology to dynamically define a ROI in an image for photometric calibration as part of a multi-camera system. The camera 50 may communicate information with the other cameras to exchange data and parameters from the camera 50, data and parameters of the other cameras, and/or computations/adjustments to improve the photometric calibration between the multiple cameras.

Figure 6:
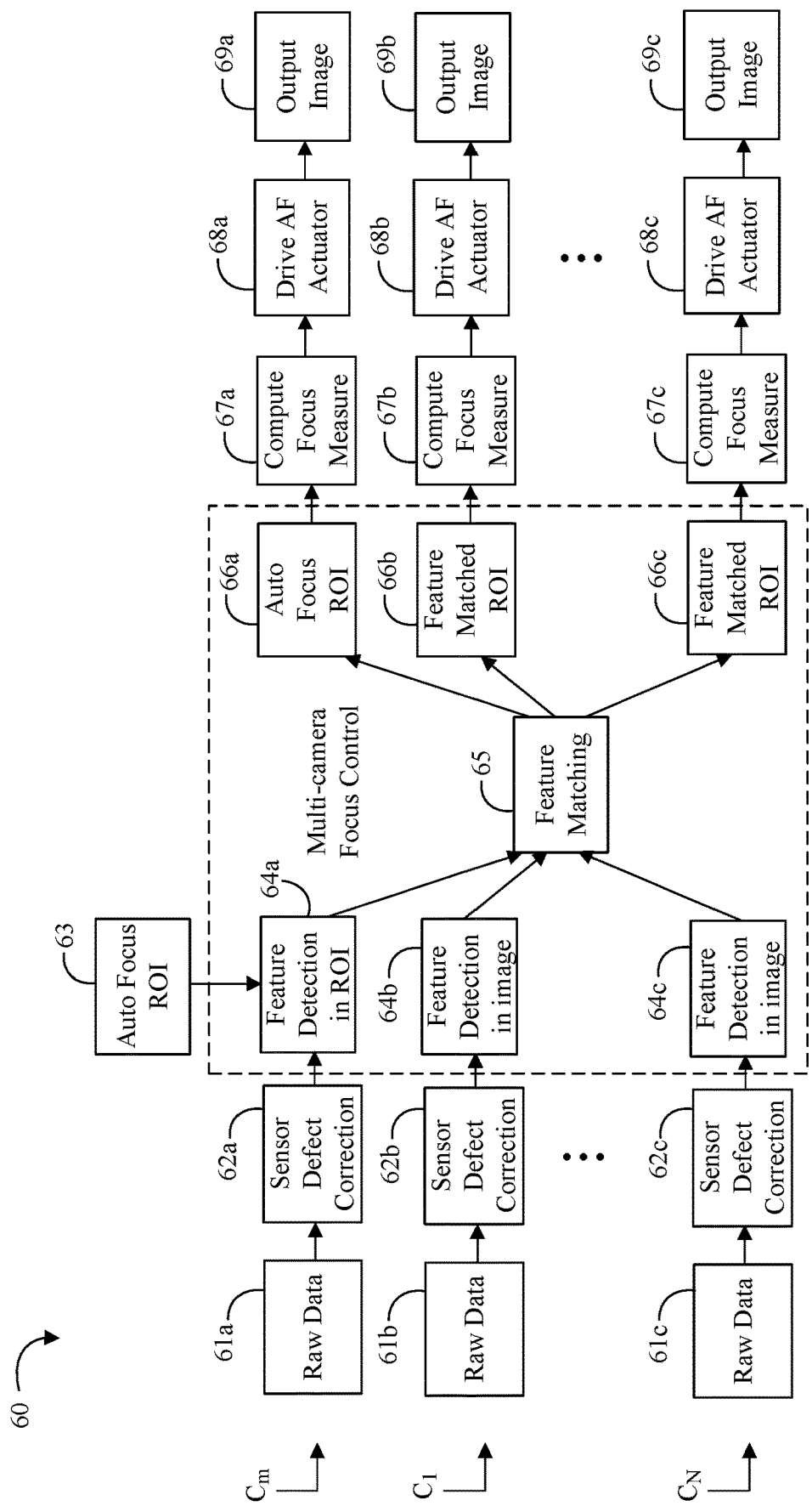
FIG. 6 is an illustrative diagram of an example of a process flow for a multi-camera system according to an embodiment.

Turning now to FIG. 6, an embodiment of a process flow 60 for a multi-camera system may include photometric calibration for multi-camera focus control. Some embodiments of the system may allow some or all cameras in the multi-camera system to focus on the same depth or on the same feature. Advantageously, some embodiments may help remove defocus blur in captured images. For example, some embodiments may determine an improved or ideal focus motor position for each of the cameras with auto-focus capability in the multi-camera grid. The features detected in the auto focus ROI of an image from a master camera may be tracked in all other cameras and feature matched ROIs may be determined for all the other images. The individual cameras may then use their feature matched ROI to determine a best focus position and may actuate the focus motor accordingly.

The process flow 60 may include each of a master camera $C_m$ and two or more additional cameras $C_1$ through $C_N$ (N>1) capturing raw data in BAYER format at blocks 61a through 61c, and filling in the defected pixels at blocks 62a through 62c. The master camera $C_m$ may select a 2D auto focus ROI in the scene on which to focus the camera at block 63. The auto focus ROI may be manually selected or may be automatically selected (e.g., as the most salient region in the image). The auto focus ROI may be of any suitable size and shape (e.g., not necessarily of any geometric shape). For example, the auto focus ROI may be based on a focus point plus and minus a delta x value and a delta y value. The master camera $C_m$ may have some fixed focus area and/or size and the auto focus ROI may correspond to that focus area and size (e.g., or plus/minus some delta x/y). The master camera $C_m$ may automatically detect a feature in the image such as faces, objects, etc., and the auto focus ROI may correspond to the detected feature focus area (e.g., plus/minus some delta x/y). The master camera $C_m$ may allow the user to select the focus region (e.g., by touching a display screen to select a focus point/area/face/object/etc.) and the auto focus ROI may correspond to the user selected focus region (e.g., or plus/minus some delta x/y).

Feature detection (e.g., SIFT) may be performed on the image from the master camera $C_m$ in the auto focus ROI at block 64a. Feature detection may be performed on the images from the cameras C1 through $C_N$ in their respective complete captured images at blocks 62b through 62c. Feature matching may be performed between features detected in the auto focus ROI and all the other images at block 65. The auto focus ROI may be selected for the master camera at block 66a, and an image dependent feature matched ROI may be selected in the other images based on tracked features at blocks 66b through 66c. Each camera may then compute a focus measure for feature points which are part of the respective auto focus ROI and feature matched ROIs at blocks 67a through 67c. The focus actuators for each camera may be driven to focus based on repetitive focus measure computations at blocks 68a through 68c, and respective output images may be provided at blocks 69a through 69c. Advantageously, the output images may focus on the same scene points from all the cameras in the system. In some embodiments, a multi-camera focus controller may perform some or all of the process flow 60 including blocks 64 through 66. The multi-camera focus controller may be a separate processor, may be implemented in one of the cameras (e.g., the master camera CM), or may be distributed between two or more of the cameras.

Figure 7:
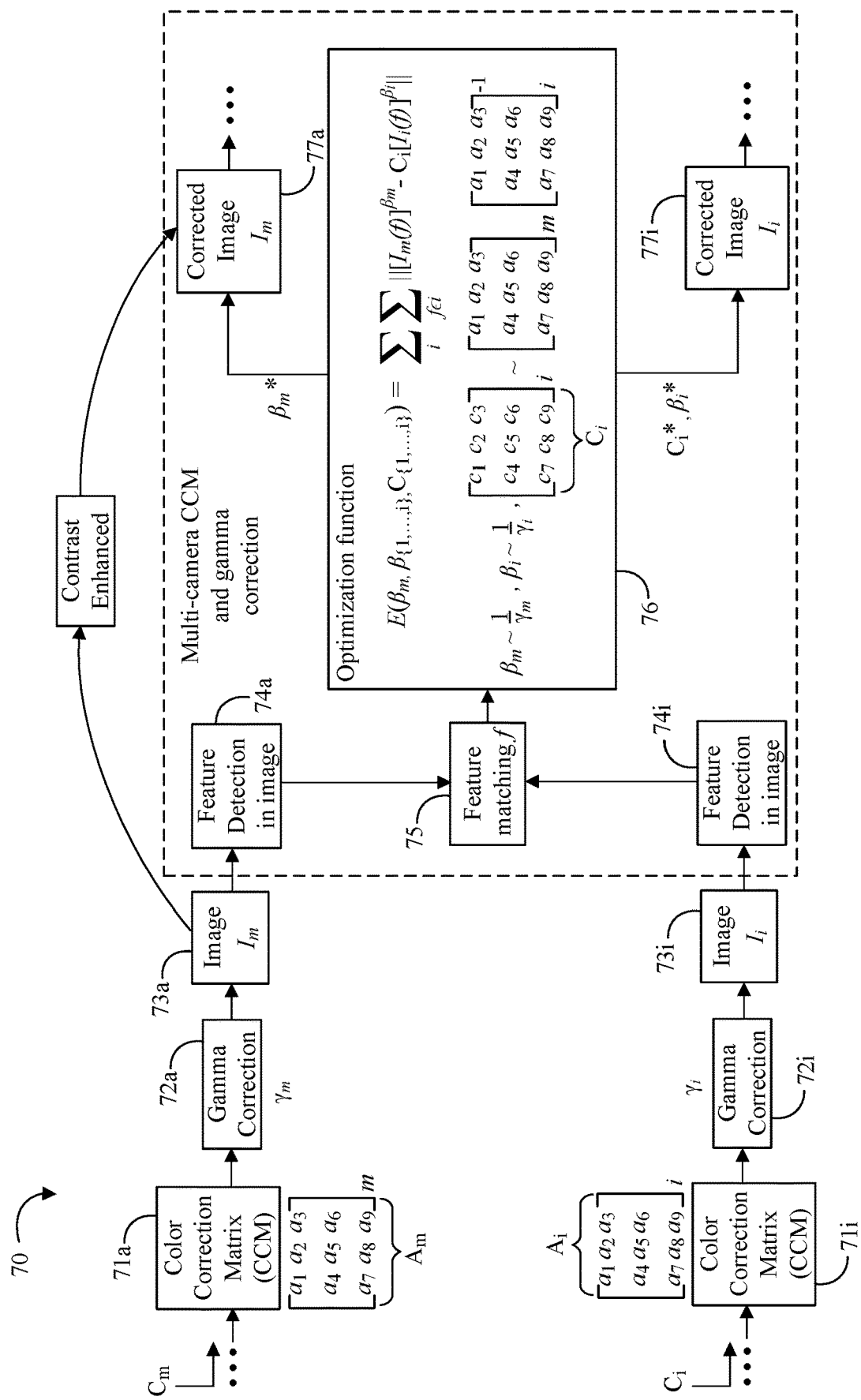
FIG. 7 is an illustrative diagram of another example of a process flow for a multi-camera system according to an embodiment.

Turning now to FIG. 7, an embodiment of a process flow 70 for a multi-camera system may include photometric calibration for color correction matrix and gamma correction. As a multi-camera system is operated, each component camera may capture scene statistics which may include a grey level histogram, a red/green color ratio, and a blue/green color ratio for each pixel. These color ratios may determine a reference illuminant and therefore the color temperature of the scene. To achieve a consistent color reproduction among the different cameras, a color correction matrix (CCM) may be computed after white balancing. The gamma correction curve for all the sensors may also be adjusted such that it results in similar contrast for all images in the multi-camera array. Some embodiments may advantageously provide multi-camera CCM and gamma correction based on feature detection, matching and an optimization function. For example, some embodiments may provide computation of multi-camera color correction matrix $C_i^*$ and gamma parameters $\beta_m^*$, $\beta_i^*$ for an $i^{th}$ camera in the multi-camera array as a part of the ISP pipeline. Some embodiments may also provide an optimization function for the computation of these parameters.

One of the cameras of the multi-camera system may be designated or selected as a master camera $C_m$ while other cameras may be designated as camera $C_i$. A single camera ISP block color correction matrix $[\alpha 1 \; \alpha 2 \ldots]_{\{(m, 1, \ldots, i\}}$ may be applied at blocks 71a through 71i and a single camera ISP block of gamma correction may be performed using parameters $\gamma_{\{m, 1, \ldots, i\}}$ at blocks 72a through 72i to provide respective images $I_m$ through $I_i$ after single camera ISP. Feature detection may be performed on each of the complete images at blocks 74a through 74i. Feature matching may then be performed for detected features across all the multi-camera images and stored as $f$ at block 75. An optimization function $E(\beta_m, \beta_{\{1, \ldots, i\}}, C_{\{1, \ldots, i\}})$ may be solved to refine the individual ISP CCM matrix and the gamma values at block 76, and the optimized parameters may then be applied to obtain corrected images at blocks 77a through 77i (e.g., and then the next ISP blocks are implemented. The CCM and gamma optimization cost $E(\beta_m, \beta_{\{1, \ldots, i\}}, C_{\{1, \ldots, i\}})$ may jointly solve for gamma correction parameters $(\beta_m, \beta_{\{1, \ldots, i\}})$ as well as the relative CCM adjustment matrix C for the master camera and the remaining cameras. The function may be initialized with CCM and gamma correction ISP parameters of individual cameras (e.g., $[\alpha 1, \alpha 2, \ldots]_{[m, \ldots i]}$ and $\gamma_{[m, \ldots, i]}$, respectively). The optimization may be performed over RGB values of feature matching locations $f$ in images $I_m$, $I_1$, . . . , $I_i$. In some embodiments, a multi-camera CCM and gamma correction module may perform some or all of the process flow 70 including blocks 74 through 77. The multi-camera CCM and gamma correction module may be a separate processor, may be implemented in one of the cameras (e.g., the master camera $C_M$), or may be distributed between two or more of the cameras.

Figure 8:
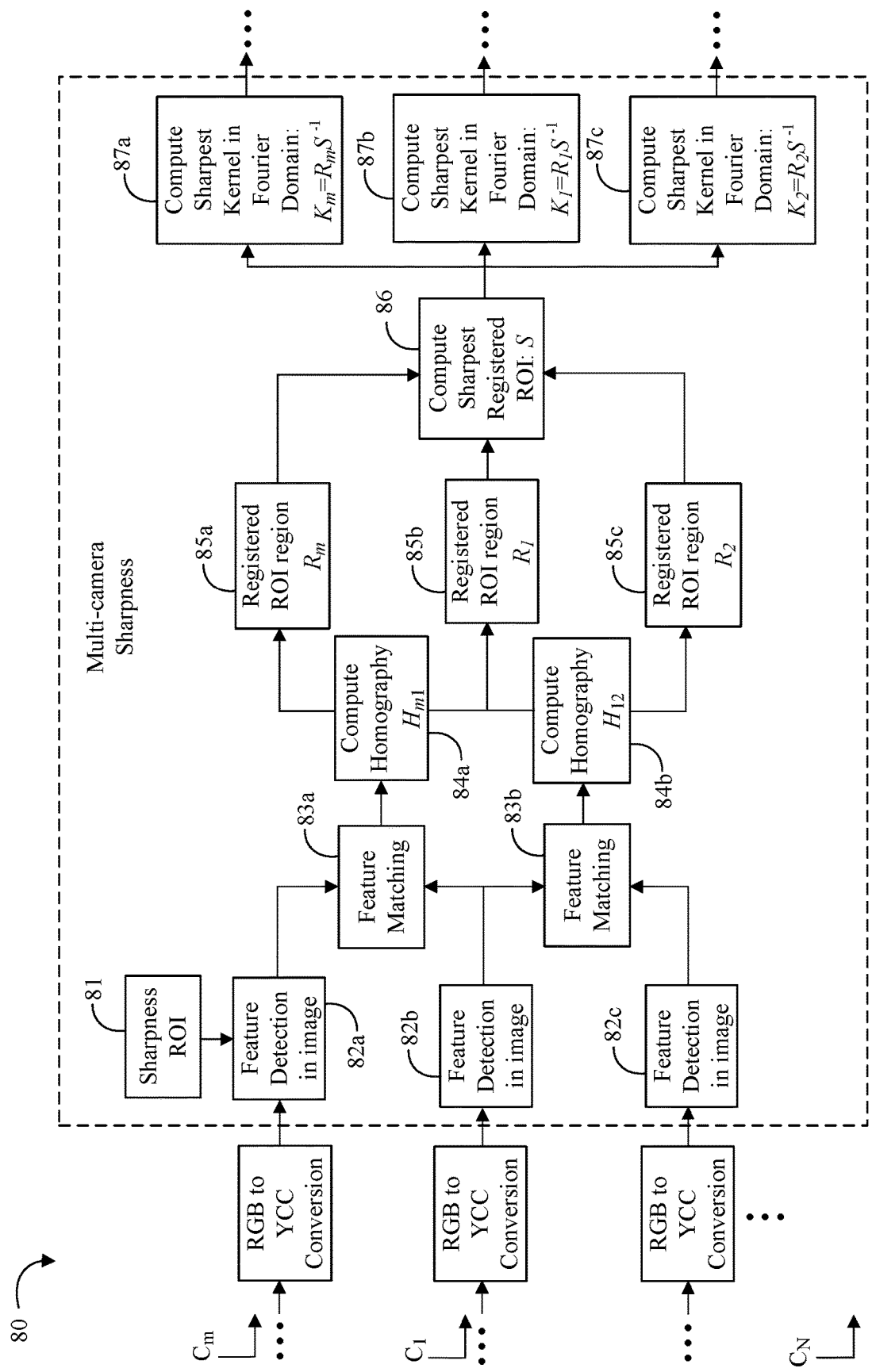
FIG. 8 is an illustrative diagram of another example of a process flow for a multi-camera system according to an embodiment.

Turning now to FIG. 8, an embodiment of a process flow 80 for a multi-camera system may include photometric calibration for sharpness. Sharpness mismatch between images from a camera array may result in sharp-blurred pairs of images. Many applications of multi-camera arrays (e.g., panoramic stitching, disparity estimation, etc.) on such image pairs may have artifacts. Some embodiments may advantageously set sharpness jointly across the camera array. Spatial frequency response (SPR) or modulation transfer function (MTF) may provide a sharpness related measure where an indicator of image sharpness may be the spatial frequencies where MTF is 50% of its low frequency value (MTF50) or 50% of its peak value (MTF50P). Some other systems may measure MTF50 of the individual cameras based on a technical target and compute the sharpness parameter to boost high frequencies in the MTF. For a multi-camera array, however, the viewpoint changes may cause the ROI on the technical target to shift for each camera. Accordingly, using a fixed ROI location on all the camera images may cause non-technical target regions of the scene to also be analyzed for MTF. Some embodiments may utilize feature detection and matching to track a master camera target ROI. Advantageously, the scene/view-point dependent ROI may remain the same for each camera and some embodiments may provide improved sharpness in a multi-camera system. In some embodiments, a homography may then be used to register the tracked ROI and resulting registered images may be used to compute individual camera dependent sharpness parameters.

One of the cameras of the multi-camera system may be designated or selected as a master camera $C_m$ while other cameras may be designated as cameras $C_1$ through $C_N$ (N>1). A ROI may be specified on a technical target in the image from master camera $C_m$ at block 81. Following the RGB to YCC conversion blocks, a feature detector may detect features in the ROI in the image from the master camera $C_m$ and in the complete image for all other cameras $C_1$ through $C_N$ at blocks 82a through 82c. Feature matching may be performed between features detected in master camera $C_m$ ROI and different images at blocks 83a through 83b. The feature matching may define ROIs in the images from the other cameras $C_1$ through $C_N$. Pairwise planar homography may be computed based on at least 4 matches being found at blocks 84a through 84b. The computed homography may be used to register/align the master camera $C_m$ ROI with the ROIs from cameras $C_1$ and $C_2$ at blocks 85a through 85c. A sharpest ROI S may be computed based on frequency analysis at block 86. For each camera image ROI, the corresponding ideal sharpest ROI may be known and the sharpness kernel may be computed in Fourier domain using the formula K=(register ROI region)*$S^{-1}$ at blocks 87a through 87c. In some embodiments, the homography may be pairwise and the pairs may be geometrically adjacent to each other. For example, geometrically adjacent cameras may have significant field of view overlap. In some embodiments, homographies may be computed for $H_{m1}$, $H_{12}$, $H_{23}$, $H_{34}$ and so on through $H_{\{N-1,N\}}$ to generate regions $R_m$, $R_1$, $R_2$, and so on through region $R_N$.

For example, for some images the master camera $C_m$ image may filter out some high frequencies. The sharpness kernel from block 87a when applied to the image of the master camera $C_m$ may results in the MTF allowing high frequency and becoming similar to the MTF of another camera. For example, the MTF50 of the master camera $C_m$ may be increased to match closer to that of another camera. The other camera, when optimized to yield better sharpness, may result in lower rectification errors and smoother disparity when combined with another camera. For example, in some embodiments of a multi-camera system optimized for sharpness, the average rectification accuracy may improve and the disparity may be less noisy In some embodiments, a multi-camera sharpness module may perform some or all of the process flow 80 including blocks 81 through 87. The multi-camera sharpness module may be a separate processor, may be implemented in one of the cameras (e.g., the master camera $C_M$), or may be distributed between two or more of the cameras. Some embodiments may include two or more multi-camera photometric calibration modules including two or more of the multi-camera focus controller (FIG. 6), the multi-camera CCM and gamma correction module (FIG. 7), and the multi-camera sharpness module (FIG. 8). Given the benefit of the present specification and drawings, applying feature detection and matching for photometric calibration based on dynamic and/or variably sized ROIs in a multi-camera system may readily be adapted to other ISP parameter blocks. The embodiments of FIGS. 6 to 8 should be considered as illustrative and not limiting.

Figure 9:
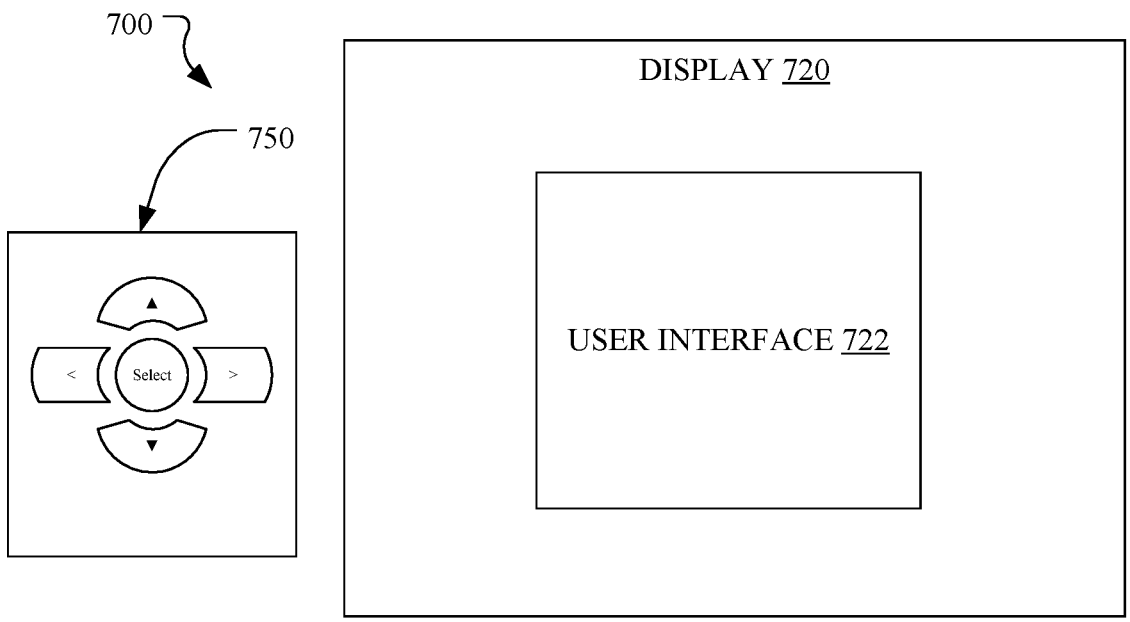
FIG. 9 is a block diagram of an example of a system having a navigation controller according to an embodiment.
Figure 9:
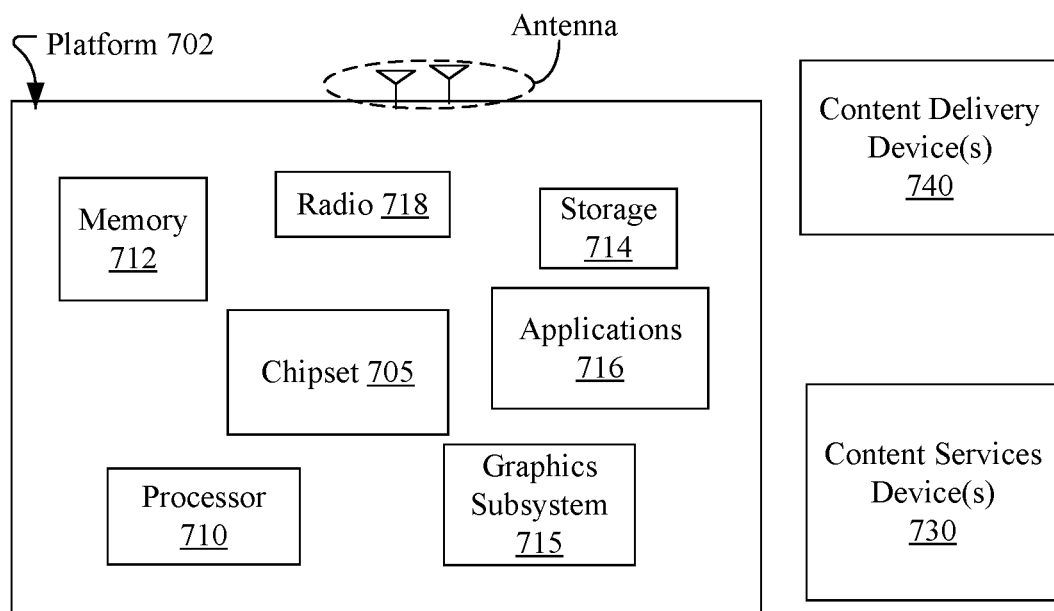

FIG. 9 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 700 comprises a platform 702 coupled to a display 720 that presents visual content. The platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, the platform 702 may comprise any combination of a chipset 705, processor 710, memory 712, storage 714, graphics subsystem 715, applications 716 and/or radio 718 (e.g., network controller). The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. An analog or digital interface may be used to communicatively couple the graphics subsystem 715 and display 720. For example, the interface may be any of a High-Definition Multimedia Interface (HDMI), DisplayPort, wireless HDMI, and/or wireless HD compliant techniques. The graphics subsystem 715 could be integrated into processor 710 or chipset 705. The graphics subsystem 715 could be a stand-alone card communicatively coupled to the chipset 705. In one example, the graphics subsystem 715 includes a noise reduction subsystem as described herein.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, the display 720 may comprise any television type monitor or display. The display 720 may comprise, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display user interface 722 on the display 720.

In embodiments, content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to the platform 702 and/or to the display 720.

In embodiments, the content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from a navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display (e.g., display 720) by movements of a pointer, cursor, focus ring, or other visual indicators displayed on the display. For example, under the control of software applications 716, the navigation features located on the navigation controller 750 may be mapped to virtual navigation features displayed on the user interface 722, for example. In embodiments, the controller 750 may not be a separate component but integrated into the platform 702 and/or the display 720. Embodiments, however, are not limited to the elements or in the context shown or described herein.

In embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and the content services device(s) 730 may be integrated, or the platform 702 and the content delivery device(s) 740 may be integrated, or the platform 702, the content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
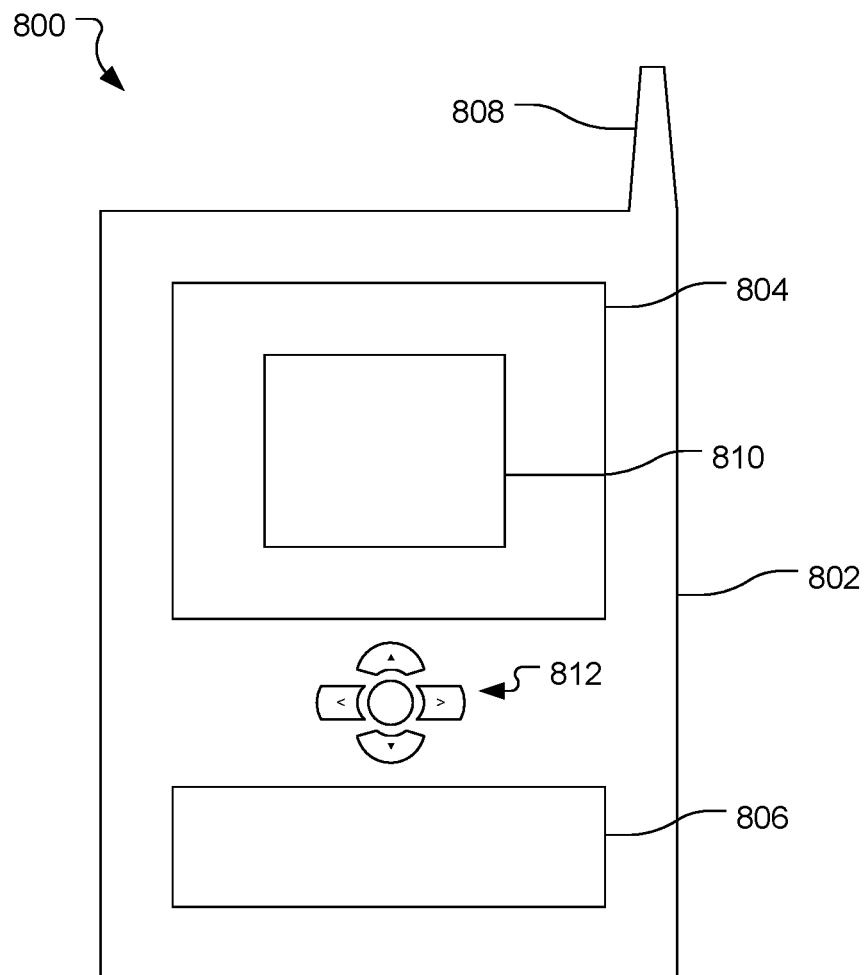
FIG. 10 is a block diagram of an example of a system having a small form factor according to an embodiment.

As described above, the system 700 may be embodied in varying physical styles or form factors. FIG. 10 illustrates embodiments of a small form factor device 800 in which the system 700 may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of microphone. Such information may be digitized by a voice recognition device. The embodiments are not limited in this context.

In some embodiments, the system 700 and/or the device 800 may implement one or more of the aspects of the multi-camera system described herein. For example, the system 700 and/or the device 800 may include one or more aspects of the following Examples.

ADDITIONAL NOTES AND EXAMPLES

Example 1 may include an electronic processing system, comprising a processor, two or more cameras communicatively coupled to the processor to capture two or more concurrent images of a scene, and logic communicatively coupled to the processor to detect a feature in a first image from a first camera of the two or more cameras, match the feature in a second image from a second camera of the two or more cameras, and perform a photometric calibration between the first camera and the second camera based on a portion of the first image corresponding to the detected feature and a portion of the second image corresponding to the matched feature.

Example 2 may include the system of Example 1, wherein the logic is further to define a first region of interest for the first camera based on the detected feature in the first image, define a second region of interest for the second camera based on the matched feature in the second image, and perform the photometric calibration between the first camera and the second camera based on the first region of interest and the second region of interest.

Example 3 may include the system of Example 2, wherein the logic is further to define the first and second regions of interest based on respective positions and sizes of the feature in the first and second images.

Example 4 may include the system of Example 1, wherein the logic is further to define a first region of interest for the first camera, detect the feature in the first image based on the first region of interest, define a second region of interest for the second camera based on the matched feature in the second image, and perform the photometric calibration between the first camera and the second camera based on the first region of interest and the second region of interest.

Example 5 may include the system of Example 4, wherein the logic is further to define the second region of interest based on a position and size of the matched feature in the second image.

Example 6 may include the system of any of Examples 1 to 5, wherein the logic is further to determine one or more parameter values for each of the two or more cameras based on the photometric calibration.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to capture two or more concurrent images of a scene with two or more cameras, detect a feature in a first image from a first camera of the two or more cameras, match the feature in a second image from a second camera of the two or more cameras, and perform a photometric calibration between the first camera and the second camera based on a portion of the first image corresponding to the detected feature and a portion of the second image corresponding to the matched feature.

Example 8 may include the apparatus of Example 7, wherein the logic is further to define a first region of interest for the first camera based on the detected feature in the first image, define a second region of interest for the second camera based on the matched feature in the second image, and perform the photometric calibration between the first camera and the second camera based on the first region of interest and the second region of interest.

Example 9 may include the apparatus of Example 8, wherein the logic is further to define the first and second regions of interest based on respective positions and sizes of the feature in the first and second images.

Example 10 may include the apparatus of Example 7, wherein the logic is further to define a first region of interest for the first camera, detect the feature in the first image based on the first region of interest, define a second region of interest for the second camera based on the matched feature in the second image, and perform the photometric calibration between the first camera and the second camera based on the first region of interest and the second region of interest.

Example 11 may include the apparatus of Example 10, wherein the logic is further to define the second region of interest based on a position and size of the matched feature in the second image.

Example 12 may include the apparatus of any of Examples 7 to 11, wherein the logic is further to determine one or more parameter values for each of the two or more cameras based on the photometric calibration.

Example 13 may include a method of calibrating multiple cameras, comprising capturing two or more concurrent images of a scene with two or more cameras, detecting a feature in a first image from a first camera of the two or more cameras, matching the feature in a second image from a second camera of the two or more cameras, and performing a photometric calibration between the first camera and the second camera based on a portion of the first image corresponding to the detected feature and a portion of the second image corresponding to the matched feature.

Example 14 may include the method of Example 13, further comprising defining a first region of interest for the first camera based on the detected feature in the first image, defining a second region of interest for the second camera based on the matched feature in the second image, and performing the photometric calibration between the first camera and the second camera based on the first region of interest and the second region of interest.

Example 15 may include the method of Example 14, further comprising defining the first and second regions of interest based on respective positions and sizes of the feature in the first and second images.

Example 16 may include the method of Example 13, further comprising defining a first region of interest for the first camera, detecting the feature in the first image based on the first region of interest, defining a second region of interest for the second camera based on the matched feature in the second image, and performing the photometric calibration between the first camera and the second camera based on the first region of interest and the second region of interest.

Example 17 may include the method of Example 16, further comprising defining the second region of interest based on a position and size of the matched feature in the second image.

Example 18 may include the method of any of Examples 13 to 17, further comprising determining one or more parameter values for each of the two or more cameras based on the photometric calibration.

Example 19 may include at least one computer readable medium, comprising a set of instructions, which when executed by a computing device, cause the computing device to capture two or more concurrent images of a scene with two or more cameras, detect a feature in a first image from a first camera of the two or more cameras, match the feature in a second image from a second camera of the two or more cameras, and perform a photometric calibration between the first camera and the second camera based on a portion of the first image corresponding to the detected feature and a portion of the second image corresponding to the matched feature.

Example 20 may include the at least one computer readable medium of Example 19, comprising a further set of instructions, which when executed by the computing device, cause the computing device to define a first region of interest for the first camera based on the detected feature in the first image, define a second region of interest for the second camera based on the matched feature in the second image, and perform the photometric calibration between the first camera and the second camera based on the first region of interest and the second region of interest.

Example 21 may include the at least one computer readable medium of Example 20, comprising a further set of instructions, which when executed by the computing device, cause the computing device to define the first and second regions of interest based on respective positions and sizes of the feature in the first and second images.

Example 22 may include the at least one computer readable medium of Example 19, comprising a further set of instructions, which when executed by the computing device, cause the computing device to define a first region of interest for the first camera, detect the feature in the first image based on the first region of interest, define a second region of interest for the second camera based on the matched feature in the second image, and perform the photometric calibration between the first camera and the second camera based on the first region of interest and the second region of interest.

Example 23 may include the at least one computer readable medium of Example 22, comprising a further set of instructions, which when executed by the computing device, cause the computing device to define the second region of interest based on a position and size of the matched feature in the second image.

Example 24 may include the at least one computer readable medium of any of Examples 19 to 23, comprising a further set of instructions, which when executed by the computing device, cause the computing device to determine one or more parameter values for each of the two or more cameras based on the photometric calibration.

Example 25 may include a multi-camera calibration apparatus, comprising means for capturing two or more concurrent images of a scene with two or more cameras, means for detecting a feature in a first image from a first camera of the two or more cameras, means for matching the feature in a second image from a second camera of the two or more cameras, and means for performing a photometric calibration between the first camera and the second camera based on a portion of the first image corresponding to the detected feature and a portion of the second image corresponding to the matched feature.

Example 26 may include the method of Example 25, further comprising means for defining a first region of interest for the first camera based on the detected feature in the first image, means for defining a second region of interest for the second camera based on the matched feature in the second image, and means for performing the photometric calibration between the first camera and the second camera based on the first region of interest and the second region of interest.

Example 27 may include the method of Example 26, further comprising means for defining the first and second regions of interest based on respective positions and sizes of the feature in the first and second images.

Example 28 may include the method of Example 25, further comprising means for defining a first region of interest for the first camera, means for detecting the feature in the first image based on the first region of interest, means for defining a second region of interest for the second camera based on the matched feature in the second image, and means for performing the photometric calibration between the first camera and the second camera based on the first region of interest and the second region of interest.

Example 29 may include the method of Example 28, further comprising means for defining the second region of interest based on a position and size of the matched feature in the second image.

Example 30 may include the method of any of Examples 25 to 29, further comprising means for determining one or more parameter values for each of the two or more cameras based on the photometric calibration.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a processor;
two or more cameras communicatively coupled to the processor to capture two or more concurrent images of a scene; and
logic communicatively coupled to the processor to:
  detect a feature in a first image from a first camera of the two or more cameras,
  match the feature in a second image from a second camera of the two or more cameras,
  determine a color correction matrix based on the detected feature and the matched feature,
  determine one or more gamma correction parameters based on the detected feature and the matched feature, and
  perform a photometric calibration for color correction and gamma correction between the first camera and the second camera based on the determined color correction matrix and the determined one or more gamma correction parameters.

2. The system of claim 1, wherein the logic is further to:
define a target region of interest for the first camera;
detect the feature in the first image based on the target region of interest;
match the detected feature in the second image from the second camera;
define a second region of interest for the second camera based on the matched feature in the second image; and
perform a sharpness calibration between the first camera and the second camera based on the target region of interest and the second region of interest.

3. The system of claim 2, wherein the logic is further to:
determine homography for the target region of interest and the second region of interest; and
align the target region of interest and the second region of interest based on the determined homography.

4. The system of claim 1, wherein the logic is further to:
define a focus region for the first camera;
detect the feature in the first image based on the focus region;
match the detected feature in the second image from the second camera;
determine a focus measure for the second camera based on the matched feature in the second image; and
adjust a focus of the second camera based on the determined focus measure.

5. The system of claim 1, wherein the logic is further to:
determine one or more parameter values, which correspond to one or more of focus, sharpness, exposure, black level, noise, white balance, and contrast, for each of the two or more cameras based on a photometric calibration for at least one additional photometric parameter.

6. A semiconductor package apparatus, comprising:
one or more substrates; and
logic coupled to the one or more substrates, wherein the logic is at least partly implemented in one or more of configurable logic and fixed-functionality hardware logic, the logic coupled to the one or more substrates to:
  capture two or more concurrent images of a scene with two or more cameras,
  detect a feature in a first image from a first camera of the two or more cameras,
  match the feature in a second image from a second camera of the two or more cameras, and
  determine a color correction matrix based on the detected feature and the matched feature,
  determine one or more gamma correction parameters based on the detected feature and the matched feature, and
  perform a photometric calibration for color correction and gamma correction between the first camera and the second camera based on the determined color correction matrix and the determined one or more gamma correction parameters.

7. The apparatus of claim 6, wherein the logic is further to:
define a target region of interest for the first camera;
detect the feature in the first image based on the target region of interest;
match the detected feature in the second image from the second camera;
define a second region of interest for the second camera based on the matched feature in the second image; and
perform a sharpness calibration between the first camera and the second camera based on the target region of interest and the second region of interest.

8. The apparatus of claim 7, wherein the logic is further to:
determine homography for the target region of interest and the second region of interest; and
align the target region of interest and the second region of interest based on the determined homography.

9. The apparatus of claim 6, wherein the logic is further to:
define a focus region for the first camera;
detect the feature in the first image based on the focus region;
match the detected feature in the second image from the second camera;
determine a focus measure for the second camera based on the matched feature in the second image; and
adjust a focus of the second camera based on the determined focus measure.

10. The apparatus of claim 6, wherein the logic is further to:
determine one or more parameter values, which correspond to one or more of focus, sharpness, exposure, black level, noise, white balance, and contrast, for each of the two or more cameras based on a photometric calibration for at least one additional photometric parameter.

11. A method of calibrating multiple cameras, comprising:
capturing two or more concurrent images of a scene with two or more cameras;
detecting a feature in a first image from a first camera of the two or more cameras;
matching the feature in a second image from a second camera of the two or more cameras;
determining a color correction matrix based on the detected feature and the matched feature;
determining one or more gamma correction parameters based on the detected feature and the matched feature; and
performing a photometric calibration for color correction and gamma correction between the first camera and the second camera based on the determined color correction matrix and the determined one or more gamma correction parameters.

12. The method of claim 11, further comprising:
defining a target region of interest for the first camera;
detecting the feature in the first image based on the target region of interest;
matching the detected feature in the second image from the second camera;
defining a second region of interest for the second camera based on the matched feature in the second image; and
performing a sharpness calibration between the first camera and the second camera based on the target region of interest and the second region of interest.

13. The method of claim 12, further comprising:
determining homography for the target region of interest and the second region of interest; and
aligning the target region of interest and the second region of interest based on the determined homography.

14. The method of claim 11, further comprising:
defining a focus region for the first camera;
detecting the feature in the first image based on the focus region;
matching the detected feature in the second image from the second camera;
determining a focus measure for the second camera based on the matched feature in the second image; and
adjusting a focus of the second camera based on the determined focus measure.

15. The method of claim 11, further comprising:
determining one or more parameter values, which correspond to one or more of focus, sharpness, exposure, black level, noise, white balance, and contrast, for each of the two or more cameras based on a photometric calibration for at least one additional photometric parameter.

16. At least one non-transitory computer readable medium, comprising a set of instructions, which when executed by a computing device, cause the computing device to:
capture two or more concurrent images of a scene with two or more cameras;
detect a feature in a first image from a first camera of the two or more cameras;
match the feature in a second image from a second camera of the two or more cameras;
determine a color correction matrix based on the detected feature and the matched feature;
determine one or more gamma correction parameters based on the detected feature and the matched feature; and
perform a photometric calibration for color correction and gamma correction between the first camera and the second camera based on the determined color correction matrix and the determined one or more gamma correction parameters.

17. The at least one non-transitory computer readable medium of claim 16, comprising a further set of instructions, which when executed by the computing device, cause the computing device to:
define a target region of interest for the first camera;
detect the feature in the first image based on the target region of interest;
match the detected feature in the second image from the second camera;
define a second region of interest for the second camera based on the matched feature in the second image; and
perform a sharpness calibration between the first camera and the second camera based on the target region of interest and the second region of interest.

18. The at least one non-transitory computer readable medium of claim 17, comprising a further set of instructions, which when executed by the computing device, cause the computing device to:
determine homography for the target region of interest and the second region of interest; and
align the target region of interest and the second region of interest based on the determined homography.

19. The at least one non-transitory computer readable medium of claim 16, comprising a further set of instructions, which when executed by the computing device, cause the computing device to:
define a focus region for the first camera;
detect the feature in the first image based on the focus region;
match the detected feature in the second image from the second camera;
determine a focus measure for the second camera based on the matched feature in the second image; and
adjust a focus of the second camera based on the determined focus measure.

20. The at least one non-transitory computer readable medium of claim 16, comprising a further set of instructions, which when executed by the computing device, cause the computing device to:

determine one or more parameter values, which correspond to one or more of focus, sharpness, exposure, black level, noise, white balance, and contrast, for each of the two or more cameras based on a photometric calibration for at least one additional photometric parameter.

* * * * *